United States Patent
Lachine

(10) Patent No.: US 12,307,961 B2
(45) Date of Patent: May 20, 2025

(54) HUE-ADAPTIVE SATURATION INCREASE FOR OLED DISPLAY POWER REDUCTION

(71) Applicant: ATI TECHNOLOGIES ULC, Markham (CA)

(72) Inventor: Vladimir Lachine, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 17/484,377

(22) Filed: Sep. 24, 2021

(65) Prior Publication Data

US 2023/0095724 A1   Mar. 30, 2023

(51) Int. Cl.
G09G 3/3233   (2016.01)
H04N 9/64    (2023.01)

(52) U.S. Cl.
CPC ............. *G09G 3/3233* (2013.01); *H04N 9/64* (2013.01); *G09G 2340/06* (2013.01)

(58) Field of Classification Search
CPC ..... G09G 3/3233; G09G 2340/06; H04N 9/64
See application file for complete search history.

(56) References Cited

U.S. PATENT DOCUMENTS

| | | | | |
|---|---|---|---|---|
| 6,122,012 | A * | 9/2000 | Segman | H04N 1/62 348/576 |
| 6,603,484 | B1 * | 8/2003 | Frisken | G05B 19/4097 345/420 |
| 9,343,042 | B2 | 5/2016 | Miller et al. | |
| 2003/0025835 | A1 * | 2/2003 | Segman | H04N 9/68 348/703 |
| 2005/0047657 | A1 * | 3/2005 | Lee | G09G 5/02 348/E9.053 |
| 2009/0040564 | A1 * | 2/2009 | Granger | H04N 1/6097 358/2.1 |

(Continued)

FOREIGN PATENT DOCUMENTS

CN   106448556   2/2017

OTHER PUBLICATIONS

Shiga, Tomokazu and Soshi Kitahara, "Power Reduction of OLED Displays by Tone Mapping Based on Helmholtz-Kohlrausch Effect", IEICE Transactions on Electronics, E100.C(11): 1026-1030, Nov. 11, 2017, doi: 10.1587/transele.E100.C.1026.

(Continued)

*Primary Examiner* — Jeff Piziali

(57) ABSTRACT

A processing system adjusts a saturation component of a hue-saturation-value (HSV) color space pixel input for an organic light emitting diode (OLED) display panel as a function of the hue component. The processing system converts components of a pixel input from a non-HSV color space to HSV components of the pixel input in HSV color space and modifies the saturation component of the pixel input in HSV color space based on the hue component of the pixel input to generate modified HSV components of the pixel input. The processing system then converts the modified HSV components of the pixel input back into the original color space to produce modified components of the pixel input in the original color space and provides the modified components of the pixel input for receipt by the OLED display, allowing the pixel to be driven at a lower pixel value while maintaining perceptual quality.

5 Claims, 5 Drawing Sheets

(56) References Cited

U.S. PATENT DOCUMENTS

| | | | |
|---|---|---|---|
| 2009/0268961 A1* | 10/2009 | Lu | H04N 9/68 |
| | | | 382/167 |
| 2014/0211985 A1* | 7/2014 | Polese | G06V 40/10 |
| | | | 382/103 |
| 2015/0179138 A1* | 6/2015 | Miller | G09G 5/02 |
| | | | 345/690 |
| 2015/0348477 A1 | 12/2015 | Kabe et al. | |
| 2016/0253981 A1* | 9/2016 | Matsui | H04N 19/132 |
| | | | 345/690 |
| 2018/0018793 A1 | 1/2018 | Min et al. | |
| 2018/0350322 A1* | 12/2018 | Marcu | G09G 5/06 |
| 2019/0206364 A1* | 7/2019 | Jeong | G09G 3/2096 |
| 2020/0066002 A1* | 2/2020 | Arnott | G06T 7/90 |
| 2020/0184690 A1* | 6/2020 | Guérin | G05B 19/4097 |
| | | | 345/420 |
| 2023/0306888 A1* | 9/2023 | Lee | G09G 3/2003 |

OTHER PUBLICATIONS

Choi et al. "Adaptive Color Saturation Control for Low Power RGBW OLED Displays" Journal of Display Technologies, vol. 12, No. 8, pp. 784-790, Aug. 2016.

Chondro et al. "Advanced Multimedia Power-Saving Method Using a Dynamic Pixel Dimmer on AMOLED Displays," IEEE Transactions on Circuits and Systems for Video Technology, vol. 28, No. 9, pp. 2200-2209, Sep. 2018.

International Search Report and Written Opinion issued in Application No. PCT/IB2022/058890, mailed Dec. 1, 2022, 10 pages.

\* cited by examiner

HUE-ADAPTIVE SATURATION INCREASE FOR OLED DISPLAY POWER REDUCTION

BACKGROUND

Unlike many display panels, such as liquid crystal display panels (LCDs), organic light emitting diode (OLED) display panels do not employ backlighting. Therefore, energy saving methods relating to backlighting that were developed for LCD display panels do not work for OLED display panels. Power consumption of OLED display panels typically is directly proportional to pixel intensity, such that the brighter the content displayed at an OLED display panel, the higher the power consumption. Power consumption also differs for OLED display panels among the different pixel color components, such as among the red (R), blue (B), and green (G) primary (independent) color components.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Figure 1:
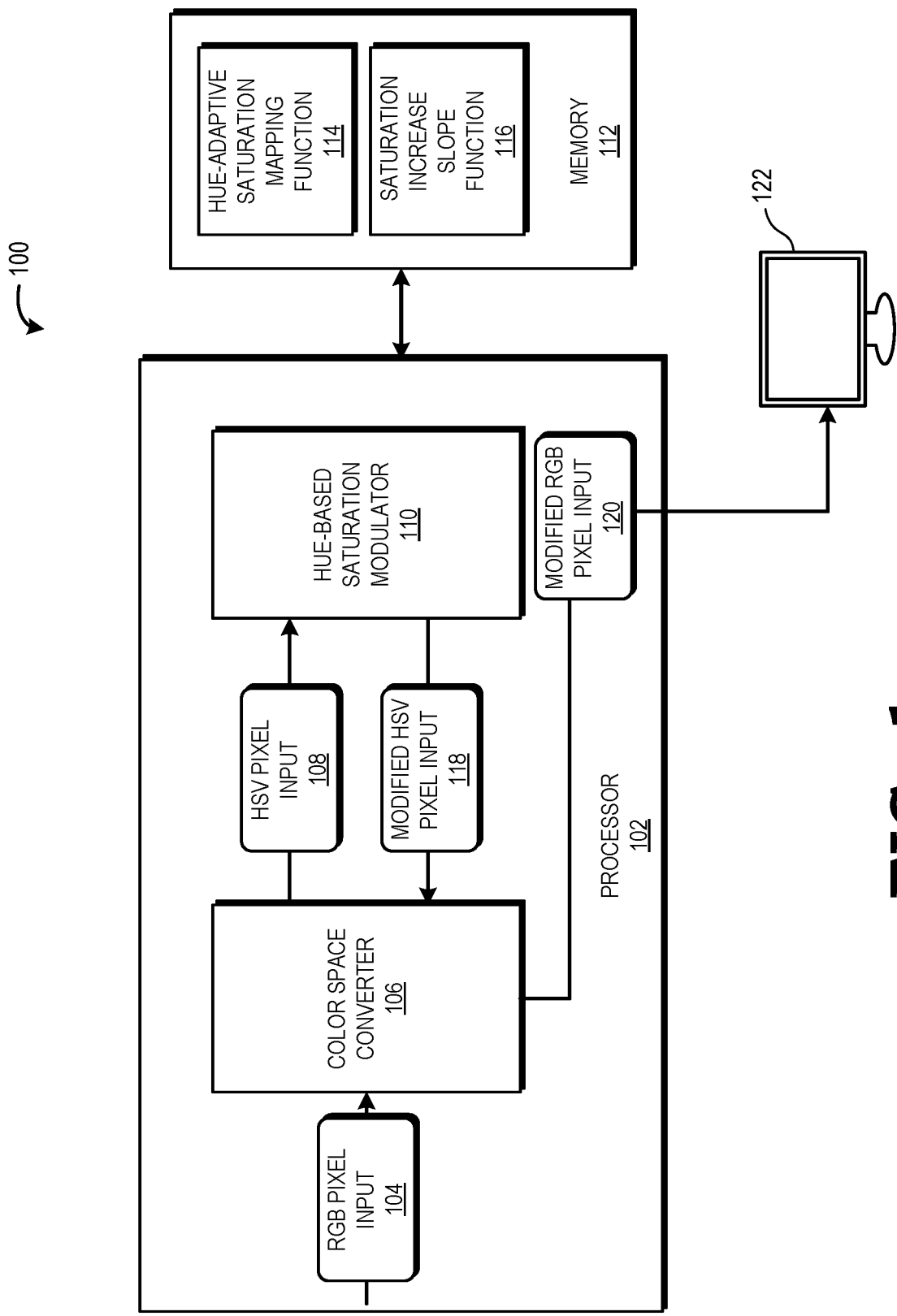
FIG. 1 is a block diagram of a processing system configured to reduce power consumption of an organic light emitting diode display panel by scaling a saturation component based on a hue component of a pixel input in accordance with some embodiments.

The average luminance of an image displayed at an organic light emitting diode (OLED) display panel can be reduced without significantly negatively impacting visual perception of the image quality by taking advantage of perceptual phenomena of the human visual system. For example, the Helmholtz-Kohlrausch (H-K) effect describes the effect whereby humans perceive color with higher saturation as brighter. By leveraging the H-K effect, a reduction in pixel values is offset by an increase in the saturation in a color space in which the intense saturation of hue is perceived as part of the color's luminance. Because power consumption is directly proportional to pixel value in OLED displays and similar displays, power consumption can be reduced by increasing saturation in such displays. The H-K effect yields the highest power savings in darker environments in which outside factors do not influence the colors. Although green and yellow colors do not have as great of an H-K effect as other colors, any hue of colored light appears brighter than non-colored (black and white) light at the same luminance.

The power savings per frame in percentage due to reducing the pixel value is calculated as follows:

$$PS(P_{org}, P_{ps}) = \frac{100}{W \times H} \sum_{x=1,y=1}^{W,H} \frac{P_{org}(x, y) - P_{ps}(x, y)}{P_{org}(x, y)}, \quad (1)$$

where power consumption per pixel may be calculated by the following equation $$P(x,y) = w_R \times (R(x,y))^\gamma + w_G \times (G(x,y))^\gamma + w_B \times (B(x,y))^\gamma, \quad (2)$$

$$w_R + w_G + w_B = 1.0, \quad (3)$$

where $w_R$, $w_G$, $w_B$ are energy consumption weights for color components, $\gamma$ is the encoding gamma of a displayed image. Gamma is required as power must be calculated in linear light space. The image to be displayed is sent to the OLED display panel in non-linear light space, and the OLED display panel's electronics convert the image to linear light space.

Increasing saturation in hue-saturation-value (HSV) color space can reduce values (i.e., brightness levels) of red, green and blue components of colorful images. The increase in saturation to offset a reduction in pixel values may be governed by a saturation mapping function that in turn is based on a slope increasing function. As the slope increases, power consumption is reduced, but color changes may occur that may negatively impact visual perception of the displayed image. In addition, the saturation mapping function is linear with a constant slope, and output values over a maximum saturation 1.0 are hard clipped to 1.0, which can also negatively impact the user experience. By adjusting the saturation component of an input pixel in hue-saturation-value (HSV) color space as a function of the hue component, performance of the OLED display panel can be tuned as a trade-off between visual quality and power consumption for different types of content, such as video games, video, photos, etc., and for different OLED display panels.

FIGS. 1-8 illustrate systems and techniques for adjusting the saturation component of an input pixel in hue-saturation-value (HSV) color space as a function of the hue component of the input pixel. A color space converter of a processing system converts color components of a pixel input for an OLED display panel from a non-HSV color space (such as red-green-blue (RGB) components in an RGB color space) to HSV components of the pixel input in HSV color space. A processor of the processing system modifies the saturation component of the pixel input in HSV color space based on the hue component of the pixel input to generate modified HSV components of the pixel input. The color space converter then converts the modified HSV components of the pixel input back into the original color space (e.g., the RGB color space) to produce modified pixel color components of the pixel input in the original color space and the processing system provides the modified pixel color components of the pixel input for receipt by the OLED display. For purposes of illustration, the systems and techniques are described in the example context of images encoded in an RGB color space, but these techniques and systems can be employed for images encoded in other color spaces.

In some embodiments, the modified saturation component is a composition of a saturation mapping function that depends on the hue component and a saturation increase slope function that depends on the hue component and the value component. In some embodiments, every hue has a unique saturation mapping function and saturation increase slope function. By varying the saturation mapping function based on the hue, the saturation mapping function exhibits soft clipping when the saturation mapping function is linear or takes a non-linear form. Soft clipping minimizes contouring visual artifacts that occur with the hard clipping of a saturation mapping function. In some embodiments, the processor uses a non-linear function to calculate the shape of the saturation increase slope function. By varying the shape of the saturation increase slope function based on the hue, the processor modulates the degree of saturation increase based on the hue and value, thereby also modulating the degree of power reduction performance.

In some embodiments, the processing system stores a multi-dimensional (e.g., three-dimensional (3D)) look up table (LUT) that represents a mapping of input pixel values to modified input pixel values. The processor accesses the 3D-LUT and interpolates points of the 3D-LUT to determine the modified saturation component of an input pixel value. The processor calculates the anchor points of the 3D-LUT off-line and generates the interpolated modified pixel values from the anchor points using tri-linear or tetrahedral interpolation at runtime.

FIG. 1 illustrates a processing system 100 configured to reduce power consumption of an OLED display panel by scaling a saturation component of a pixel input based on a hue component of the pixel input in accordance with some embodiments. The processing system 100 includes at least one processor 102 and at least one memory 112. The processor 102 includes a color space converter 106 and a hue-based saturation modulator 110. The processing system 100 provides a modified red-blue-green (RGB) pixel input 120 to an OLED display panel 122. The processing system 100 is generally configured to execute sets of instructions (e.g., computer programs) to carry out specified tasks for an electronic device. Examples of such tasks include controlling aspects of the operation of the electronic device, displaying information to a user to provide a specified user experience, communicating with other electronic devices, and the like. Accordingly, in different embodiments the processing system 100 is employed in one of a number of types of electronic device, such as a desktop computer, laptop computer, server, game console, and the like. It should be appreciated that processing system 100 may include more or fewer components than illustrated in FIG. 1.

The processor 102 in some embodiments is a parallel processor configured to execute a single instruction on a multiple data or threads in a parallel manner. Examples of parallel processors include processors for performing graphics, machine intelligence or compute operations. In some implementations, parallel processors are separate devices that are included as part of a computer. In other implementations such as advance processor units, parallel processors are included in a single device along with a host processor such as a central processor unit (CPU). Although in some embodiments the processor 102 is a graphics processing unit (GPU), the embodiments and implementations described below are applicable to other types of parallel processors.

The memory 112 includes non-persistent memory, such as dynamic random access memory (DRAM) (not shown). In various embodiments, the memory 112 stores processing logic instructions, constant values, variable values during execution of portions of applications or other processing logic, or other desired information. For example, in various embodiments, parts of control logic to perform one or more operations on the processor 102 reside within the memory 112 during execution of the respective portions of the operation by the processor 102. During execution, respective applications, operating system functions, processing logic commands, and system software reside in the memory 112. In some embodiments, other software commands also reside in the memory 112 during execution of processing system 100. In some embodiments, the processor 102 includes additional non-volatile memory, or dedicated memory that is either on-chip or off-chip with a dedicated power rail such that the memory remains powered up when the processor 102 is powered down (i.e., fully or partially power gated).

The processor 102 receives data representative of images for display at the OLED display panel 122. The images are represented by values of pixels. The pixel values are numbers that indicate colors produced by the pixels according to a color system that defines a gamut of colors. For example, the pixel values can include three numbers that indicate red, green, and blue components of the color produced by each pixel. The OLED display panel 122 uses the pixel values to determine the color that is generated by each pixel to produce the image that is displayed on the OLED display panel 122.

The color space converter 106 converts red-green-blue (RGB) components of a pixel input 104 to hue-saturation-value (HSV) components of the pixel input 108 in HSV color space. The conversion from R,'G', B' (non-linear) components to saturation S, value V, and hue H is defined as follows:

$$MAX = MAX(R', G', B'), MIN = MIN(R', G', B') \quad (4)$$

$$S = \begin{cases} 0, & \text{if } MAX = 0 \\ \dfrac{MAX - MIN}{MAX}, & \text{otherwise} \end{cases} \quad (5)$$

$$V = MAX, \quad (6)$$

$$H = \begin{cases} \text{undefined}, & \text{if } MAX = MIN \\ 60 \times \dfrac{G' - B'}{MAX - MIN}, & \text{if } MAX = R \\ 60 \times \dfrac{B' - R'}{MAX - MIN} + 120, & \text{if } MAX = G \\ 60 \times \dfrac{R' - G'}{MAX - MIN} + 240, & \text{if } MAX = B \end{cases} \quad (7)$$

where R'G'B' values are in the range [0,1], the HSV values are in the ranges H=[0,360), S=[0,1], and V=[0,1]. The color space converter 106 is implemented as hard-coded or programmable logic, one or more processors executing software/firmware instructions, or any combination thereof.

The color space converter 106 provides the HSV pixel input 108 to the hue-based saturation modulator 110. The hue-based saturation modulator 110 accesses a hue-adaptive saturation mapping function 114 and a saturation increase slope function 116 stored at the memory 112. The hue-based saturation modulator 110 applies the hue-adaptive saturation mapping function 114 and a saturation increase slope function 116 to the HSV pixel input 108 to generate a modified saturation component of the HSV pixel input 108.

In response to the power consumption of the OLED display panel 122 varying for different color components such that the Helmholtz-Kohlrausch effect varies with hue, the hue-based saturation modulator 110 applies a hue-adaptive saturation mapping function 114 that varies saturation with hue, as follows:

$$S_{out} = f_{sm}(H, S_{inp}, V), \quad (8)$$

where the function $f_{sm}(H, S, V)$ has three input variables: hue H, saturation S, and value V. In some embodiments, as the function $f_{sm}(H, S, V)$ becomes more complicated, the hue-based saturation modulator accesses the function $f_{sm}(H, S, V)$ in tabulated form such as a three-dimensional (3D) lattice. The 3D lattice is defined for a set of evenly or unevenly distributed 3D lattice points for dynamic ranges of the input variables H=[0,360), S=[0,1], and V=[0,1] as follows:

$$S_j = f_{sm}(H_i, S_j, V_k) \quad (9)$$

where i=0, ..., $N^H$, j=0, ..., $N^S$, and k=0, ..., $N^V$, $N^H$ is number of points along H axis, $N^S$ is number of points along S axis, and $N^V$ is number of points along V axis, such that the 3D lattice has $N^H \times N^S \times N^V$ points in total.

In some cases, the hue-adaptive saturation mapping function may be represented analytically as a function of a hue adaptive mapping function $f_m(H, S)$ and a hue adaptive slope function $f_s(H, V)$ as follows:

$$f_{sm}(H,S,V) = f_m(H,S,f_s(H,V)). \quad (10)$$

By varying the saturation component based on the hue component, the hue-based saturation modulator 110 reduces power consumption of the OLED display panel 122, while maintaining or improving visual quality of the image, either by soft clipping of linear mapping functions or by using non-linear functions. As an example, a power function of S may be used as $f_m$ for a fixed hue value H=h as follows:

$$f_m(h,S,f_s(h,V)) = S^{(f_s(h,v)+(1-f_s(h,v)) \times S)}. \quad (11)$$

In embodiments in which the hue-adaptive saturation modulator 110 uses a non-linear function $f_s$ to define the slope function, the hue-adaptive saturation modulator 110 modulates the degree of saturation increase per hue and value, and by doing so modulates power reduction performance of the OLED display panel 122.

In some embodiments, the hue-adaptive saturation modulator 110 uses a power function of Vas $f_s$ for a fixed hue value H=h, and pre-defined maximum slope $S_{max}^h$ and exponent $e_h$ for any hue value h as follows:

$$f_s(h,V) = S_{max}^h + (1 + s_{max}^h) \times V^{e_h}. \quad (12)$$

In some embodiments, the hue-adaptive saturation mapping function 114 varies with hue as $$S_{out} = \text{MIN}(S_{inp} \times k(H,V), 1.0), \quad (13)$$

where the saturation increase slope function k is a function of two variables: the value V and the value H. For example, the saturation increase slope function is defined in some embodiments by multiplying the maximum slope $k_{max}$ as a function of hue H and the saturation increase slope shape $k_{shape}$ as a function of hue H and value V:

$$k(H,V) = k_{max}(H) \times k_{shape}(H,V). \quad (14)$$

In operation, the processor 102 receives a pixel input in RGB color space (RGB pixel input 104). The color space converter 106 converts the RGB pixel input 104 to HSV color space, generating HSV pixel input 108. The color space converter 106 provides the HSV pixel input 108 to the hue-based saturation modulator 110. The hue-based saturation modulator 110 accesses the hue-adaptive saturation mapping function 114 and the saturation increase slope function 116 stored at the memory 112 to modify the saturation component of the HSV pixel input 108 and generate a modified HSV pixel input 118.

The hue-based saturation modulator 110 provides the modified HSV pixel input 118 to the color space converter 106. The color space converter 106 converts the modified HSV pixel input 118 to RGB color space and generates a modified RGB pixel input 120. The processor 102 provides the modified RGB pixel input 120 to the OLED display panel 122 for display. The modified RGB pixel input 120 uses reduced power consumption compared to the power consumption that would have been used for the original RGB pixel input 104 without negatively impacting visual perception of the image.

Figure 2:
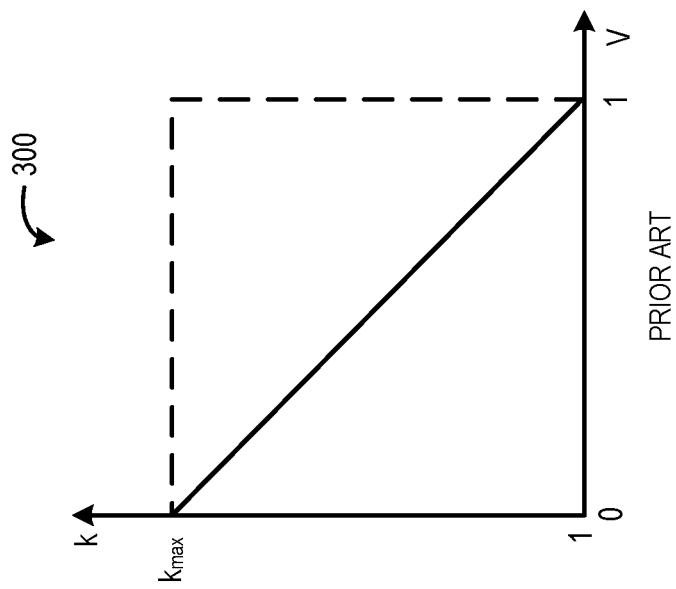
FIG. 2 is a diagram of conventional linear saturation mapping with hard clipping.

FIG. 2 is a diagram 200 of conventional linear saturation mapping with hard clipping. Conventionally, the saturation mapping function is independent of the hue component and is calculated as follows:

$$S_{out} = \text{MIN}(S_{inp} \times k(V), 1.0), \quad (15)$$

$$k(V) = k_{max} + (1 - k_{max}) \times V. \quad (16)$$

where the slope k 202 is reduced with an increase in brightness to suppress excessive increase of saturation. Thus, the modified saturation component $S_{out}$ varies as a function of the slope increasing function k(V), both of which are independent of the hue component. As the maximum slope $k_{max} > 1$ is approached, more power is reduced, but unpleasant color changes may take place. The conventional saturation mapping curve is the same for all hues and is thus non-hue adaptive. Moreover, the conventional saturation mapping curve is linear with constant slope, and values over 1.0 are hard clipped as shown in FIG. 2.

Figure 3:
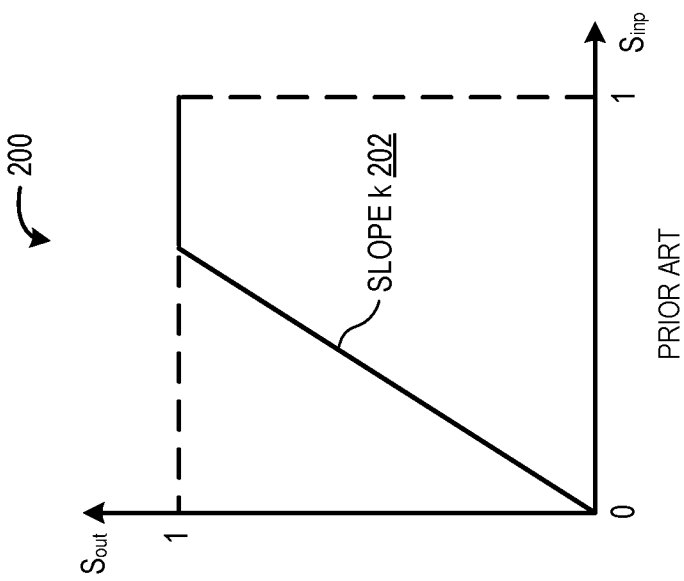
FIG. 3 is a diagram of a conventional linear slope increasing function.

FIG. 3 is a diagram 300 of a conventional linear slope increasing function k(V). Conventionally, the slope of the saturation mapping curve is calculated based on the slope increasing function, which is linear for all values and all hues, and is therefore non-hue adaptive as shown FIG. 3.

Figure 4:
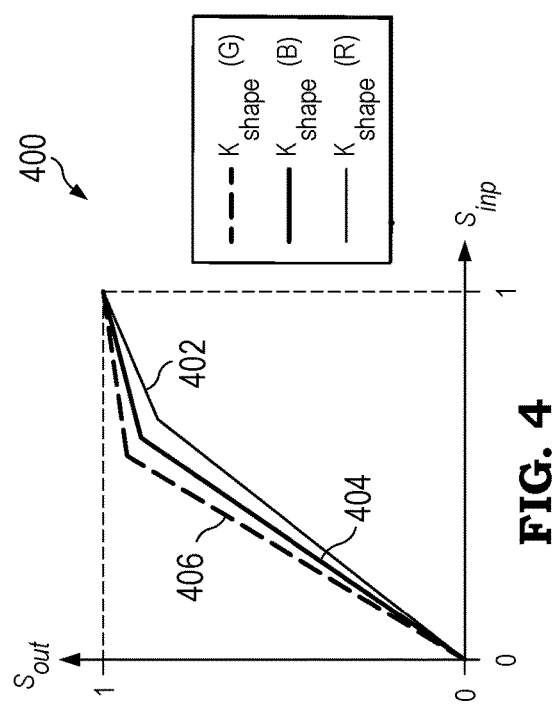
FIG. 4 is a diagram of examples of linear saturation mappings with soft clipping based on hue in accordance with some embodiments.

By contrast, the hue-adaptive saturation modulator 110 uses the hue-adaptive saturation mapping function 114, examples of which are illustrated in FIG. 4. FIG. 4 is a diagram 400 of three linear saturation mappings 402, 404, 406, with soft clipping based on hue in accordance with some embodiments. In the illustrated example, linear saturation mapping 402 maps an input saturation component $S_{inp}$ to an output (modified) saturation component Saw for a saturation increase slope function $k_{shape}(R)$ for a red hue. Linear saturation mapping 404 maps an input saturation component $S_{inp}$ to an output (modified) saturation component Saw for a saturation increase slope function $k_{shape}(B)$ for a blue hue. Similarly, linear saturation mapping 406 maps an input saturation component $S_{nip}$ to an output (modified) saturation component Saw for a saturation increase slope function $k_{shape}(G)$ for a green hue. Each of the linear saturation mappings 402, 404, 406 exhibits soft clipping, as they do not clamp output saturation Saw until the input saturation component $S_{inp}$ equals 1.0. In addition, each of the linear saturation mappings 402, 404, 406 differs from the others, as they are each based on different hues.

Figure 5:
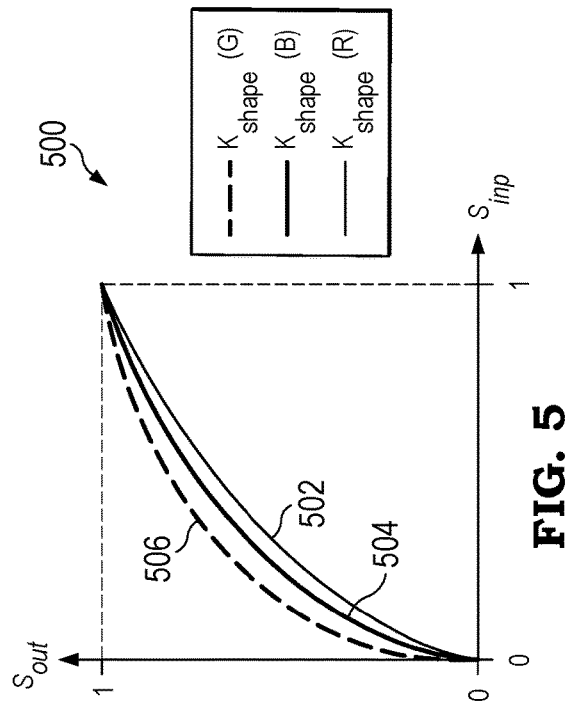
FIG. 5 is a diagram of examples of non-linear saturation mappings based on hue in accordance with some embodiments.

As described above, in some embodiments the hue-adaptive saturation modulator 110 uses a non-linear function $f_s$ to define the slope function. FIG. 5 is a diagram 500 with examples of three non-linear saturation mappings based on hue in accordance with some embodiments. In the illustrated example, non-linear saturation mapping 502 maps an input saturation component $S_{inp}$ to an output (modified) saturation component $S_{out}$ for a saturation increase slope function $k_{shape}(R)$ for a red hue. Non-linear saturation mapping 504 maps an input saturation component $S_{inp}$ to an output (modified) saturation component $S_{out}$ for a saturation increase slope function $k_{shape}(B)$ for a blue hue. Similarly, non-linear saturation mapping 506 maps an input saturation component $S_{inp}$ to an output (modified) saturation component $S_{out}$ for a saturation increase slope function $k_{shape}(G)$ for a green hue. Each of the non-linear saturation mappings 502, 504, 506 differs from the others, as they are each based on different hues. In addition, due to their non-linear shapes and variance with hue, none of the non-linear saturation mappings 502, 504, 506 exhibits hard clipping.

Figure 6:
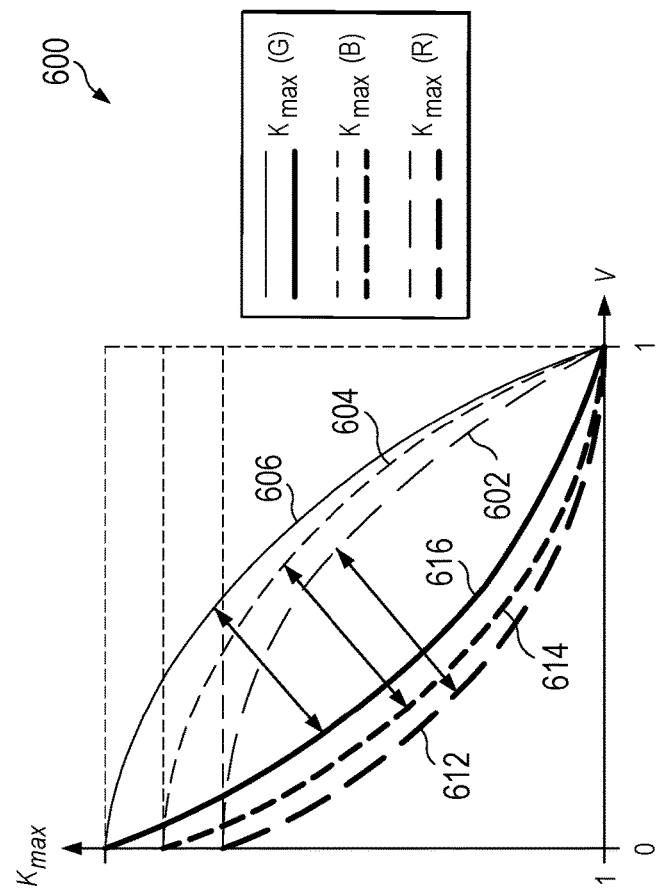
FIG. 6 is a diagram of examples of non-linear saturation increase slope functions based on hue in accordance with some embodiments.

FIG. 6 is a diagram 600 with examples of non-linear saturation increase slope functions 602, 604, 606, 612, 614, 616 based on hue in accordance with some embodiments. In some embodiments, the hue-based saturation modulator 110 uses a non-linear function $f_s$ to define the saturation increase slope function 116. By varying a shape of saturation increase slope function 116, the hue-based saturation modulator 110 controls the degree of saturation increase based on hue and value. Non-linear saturation increase slope functions 602, 612 represent examples of slope functions for red hue. Non-linear saturation increase slope functions 604, 614 represent examples of slope functions for blue hue, and non-linear saturation increase slope functions 606, 616 represent examples of slope functions for green hue. Different saturation increase slope functions result in varying degrees of reduction in power consumption. For example, the non-linear saturation increase slope functions 602, 604, 606 reduce power consumption more than the non-linear saturation increase slope functions 612, 614, 616.

In some embodiments, rather than determining per-pixel hue-adaptive saturation mapping at the processor 102, the processing system 100 implements a 3D look-up table (3D-LUT) that represents input R'G'B' to output R'G'B' mapping. In some embodiments, the 3D-LUT is implemented in hardware, with only anchor points of the 3D-LUT being calculated off-line. At runtime, the hue-based saturation modulator 10 generates output pixel values from the anchor points using tri-linear or tetrahedral interpolation.

Figure 7:
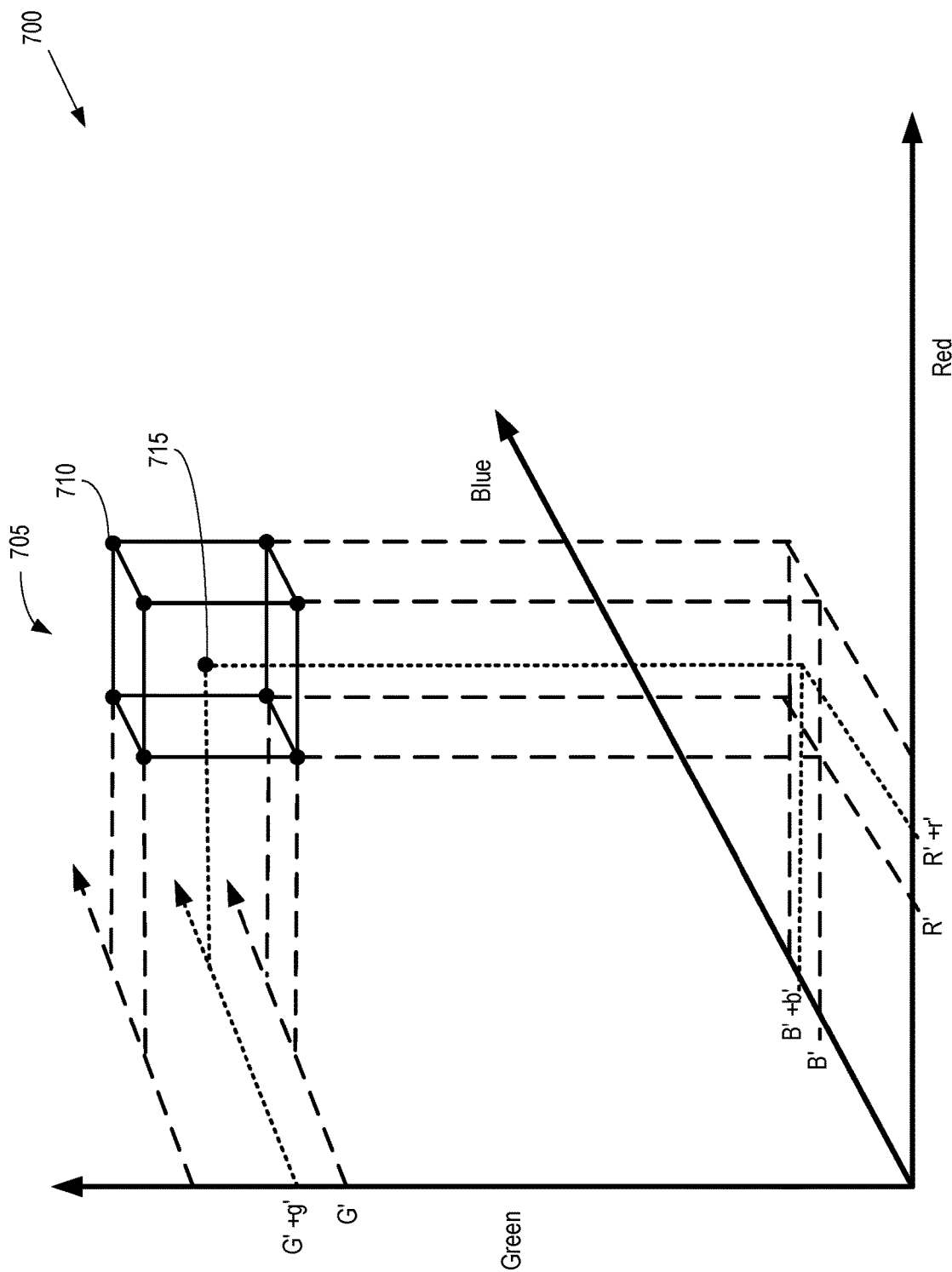
FIG. 7 is a diagram of a three-dimensional look up table in accordance with some embodiments.

FIG. 7 is a diagram of a portion 700 of a lattice that represents a 3D-LUT according to some embodiments. The hue-based saturation modulator 110 includes or has access to a 3D LUT that stores samples of hue-based modified RGB color values of a modified RGB pixel input 120 corresponding to color values of an RGB pixel input 104. The 3D LUT is represented as a lattice having three dimensions that correspond to three color components in the first gamut. For example, the 3D-LUT can be represented as a lattice having a first dimension corresponding to the red color component, a second dimension corresponding to the green color component, and a third dimension corresponding to the blue color component. Thus, the 3D-LUT has a first number of entries along a first axis, a second number of entries along a second axis, and a third number of entries along a third axis. Each vertex (entry) in the 3D-LUT is associated with a sample of color values of a modified RGB pixel input that correspond to the color values of the RGB pixel input. For example, the color component values $(R_1, G_1, B_1)$ for RGB pixel inputs to a vertex in a lattice of the 3D-LUT that is associated with corresponding color component values $(R_2, G_2, B_2)$ of modified RGB pixel inputs.

The color component values of the input color are provided to the hue-based saturation modulator 110, which can identify vertices in the 3D-LUT that define a cube or tetrahedron that encompasses a location in the 3D-LUT indicated by the component values of the input color. The hue-based saturation modulator 110 is further configured to map the input color to an output color based on the location in the 3D-LUT, e.g., using trilinear or tetrahedral interpolation.

In the interest of clarity, a single cube 705 from the lattice is shown in the portion 700. The cube 705 is defined by a set of vertices 710 (only one indicated by a reference numeral in the interest of clarity) in the lattice. Each vertex 710 is addressed or identified by color component values in a first gamut which corresponds to the unmodified RGB pixel input 104. For example, the portion 700 of the lattice is defined in an RGB color space so that the three axes of the 3D-LUT correspond to the red, green, and blue color components. The vertex 710 is then identified based on the color component values (R', G', B').

Each of the vertices 710 is associated with mapped color component values in a second gamut which corresponds to the modified RGB pixel input 120. The color component values associated with the vertices 710 can therefore be used to map input colors in the first gamut to output colors in the second gamut by interpolating from the color component values associated with the vertices 710 to locations indicated by the input color in the first gamut. In some embodiments, tetrahedral interpolation is used to determine an output color by interpolating from four of the vertices 710 to the location of the input color. For example, values of the color components in the second gamut associated with four of the vertices 710 can be interpolated to a location 715 in the cube 705 of the lattice that represents the 3D-LUT. The location 715 is indicated by the color components (R'+r', G'+g', B'+b') of the input color of the first gamut. The offsets (r', g', b') relative to the color component values (R', G', B') at the vertices 210 are determined by converting the RGB pixel inputs to HSV color space, modifying the saturation component based on hue in HSV color space to generate a modified HSV pixel input, and converting the modified HSV pixel input to RGB color space to generate a modified RBG pixel input.

Figure 8:
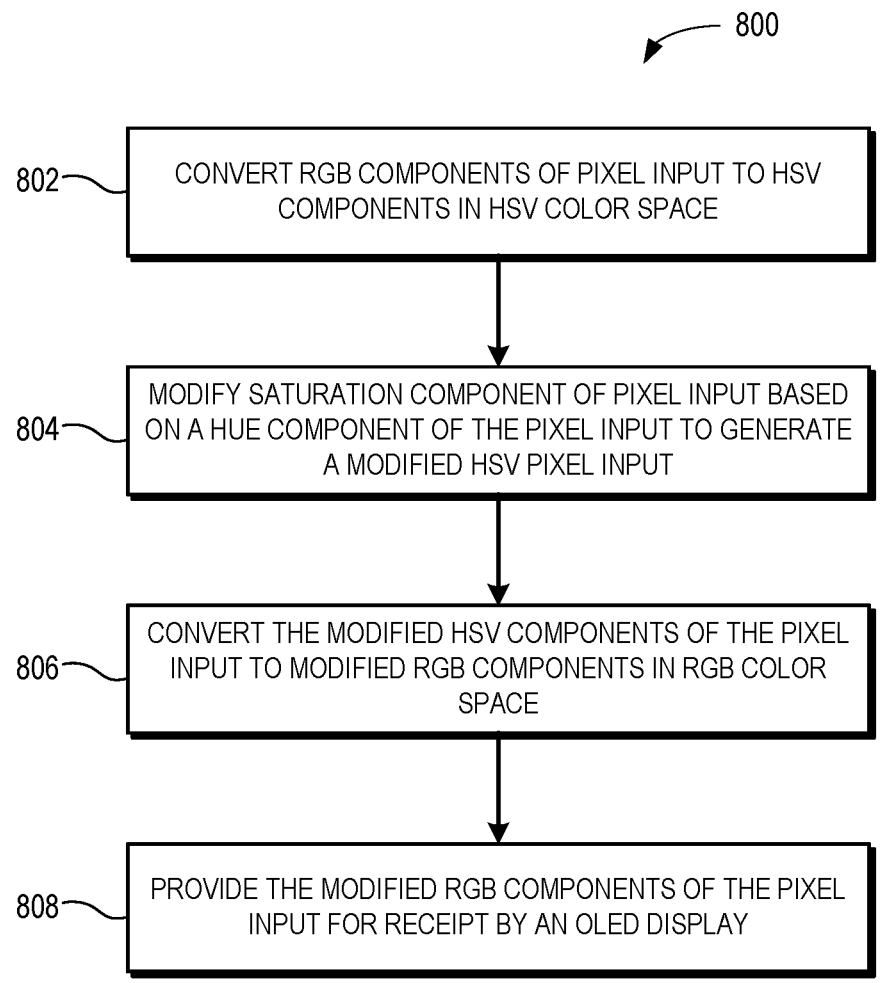
FIG. 8 is a flow diagram illustrating a method for scaling a saturation component based on a hue component of a pixel input in accordance with some embodiments.

FIG. 8 is a flow diagram illustrating a method 800 for scaling a saturation component based on a hue component of a pixel input in accordance with some embodiments. Method 800 is implemented in a processing system such as processing system 100 of FIG. 1. In some embodiments, method 800 is initiated by one or more processors in response to one or more instructions stored by a computer-readable storage medium.

At block 802, the color space converter 106 converts the RGB components of an RGB pixel input 104 in RGB color space to HSV components in HSV color space to generate an HSV pixel input 108. The color space converter 106 provides the HSV pixel input 108 to the hue-based saturation modulator 110.

At block 804, the hue-based saturation modulator 110 modifies the saturation component of the HSV pixel input 108 based on the hue component of the HSV pixel input 108 to generate a modified HSV pixel input 118. In some embodiments, the hue-based saturation modulator 110 modifies the saturation component of the HSV pixel input 108 by accessing the hue-adaptive saturation mapping function 114 and the saturation increase slope function 116 stored at the memory 112 to modify the saturation component of the HSV pixel input 108 and generate a modified HSV pixel input 118. The hue-based saturation modulator 110 provides the modified HSV pixel input 118 to the color space converter 106. In other embodiments, the processor 102 accesses a hardware 3D-LUT that represents a pixel input to modified pixel input mapping.

At block 806, the color space converter 106 converts the components of the modified HSV pixel input 118 in HSV color space to RGB color space to generate a modified RGB pixel input 120. At block 808, the processor 102 provides the modified RGB pixel input 120 for receipt by the OLED display panel 122. The modified RGB pixel input 120 requires a lower pixel value (and therefore lower power) to achieve a display output that is visually comparable (perceptually similar) to the RGB pixel input 104 at a higher pixel value.

In some embodiments, the apparatus and techniques described above are implemented in a system including one or more integrated circuit (IC) devices (also referred to as integrated circuit packages or microchips), such as the processing system described above with reference to FIGS. 1-8. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A device, comprising:
a processor to:
  decrease a value component of a pixel input in hue-saturation-value (HSV) color space to generate a decreased value component;
  modify a saturation component of the pixel input based on a hue-adaptive non-linear saturation mapping function to generate a modified saturation component to offset the decrease in the value component;
  generate modified HSV components of the pixel input comprising the decreased value component and the modified saturation component; and
  provide an output to an organic light emitting diode (OLED) display panel based on the modified HSV components of the pixel input.

2. The device of claim 1, the processor to:
convert components of the pixel input for the OLED display panel from a first color space to hue-saturation-value (HSV) components of the pixel input in HSV color space; and
convert the modified HSV components of the pixel input to modified components of the pixel input in the first color space for output to the OLED display panel.

3. The device of claim 1, wherein the processor selects the hue-adaptive non-linear saturation mapping function from a plurality of non-linear saturation mapping functions based on a hue component of the pixel input, wherein the plurality of non-linear saturation mapping functions comprises a first non-linear saturation mapping function corresponding to a green hue, a second non-linear saturation mapping function corresponding to a blue hue, and a third non-linear saturation mapping function corresponding to a red hue.

4. The device of claim 1, wherein the processor is to interpolate points of a three-dimensional (3D) look up table (LUT) to generate the modified saturation component, wherein the 3D LUT comprises a first number of entries along a first axis, a second number of entries along a second axis, and a third number of entries along a third axis.

5. The device of claim 1, wherein the hue-adaptive non-linear saturation mapping function is based on a hue-adaptive slope increase function, wherein the hue-adaptive slope increase function is a product of a maximum slope as a function of a hue component of the pixel input and a saturation increase slope shape as a function of the hue component and the value component.

* * * * *